(12) United States Patent
Spivak et al.

(10) Patent No.: US 7,990,812 B2
(45) Date of Patent: Aug. 2, 2011

(54) STORAGE SYSTEMS AND METHODS FOR PUBLISHING DEVICE ADDRESSES

(75) Inventors: Scott Spivak, Fort Collins, CO (US); Bradley Taulbee, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 475 days.

(21) Appl. No.: 12/243,368

(22) Filed: Oct. 1, 2008

(65) Prior Publication Data

US 2010/0080090 A1  Apr. 1, 2010

(51) Int. Cl.
*G11B 7/085* (2006.01)
(52) U.S. Cl. ............... 369/30.28; 369/30.38; 369/30.42
(58) Field of Classification Search ............... 369/30.28, 369/30.4, 30.38, 30.42, 30.34, 30.32, 30.31, 369/30.3, 30.29, 30.27; 380/277, 278; 720/641; 711/170

See application file for complete search history.

(56) References Cited

U.S. PATENT DOCUMENTS 6,941,569 B2 * 9/2005 Holmquist et al. ........... 720/641

* cited by examiner

*Primary Examiner* — Ali Neyzari

(57) ABSTRACT

Storage systems and methods for publishing device addresses are disclosed. An exemplary method may include receiving addresses for a plurality of device objects in the storage system over an out-of-band path to each of the device objects. The method may also include storing the addresses for the plurality of device objects in the storage system. The method may also include returning the addresses for the plurality of device objects in the storage system over another out-of-band path to an interface manager for the storage system.

21 Claims, 3 Drawing Sheets

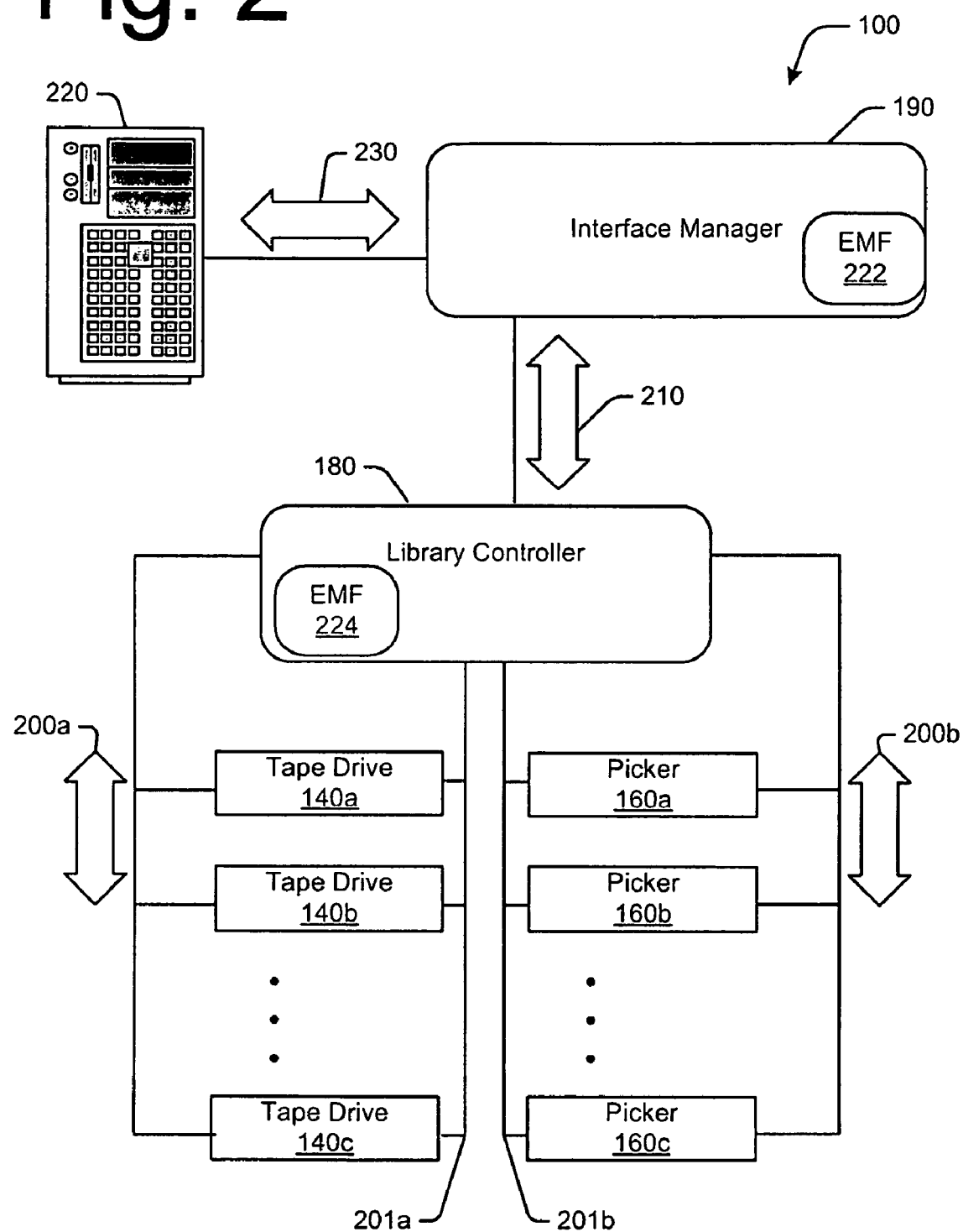

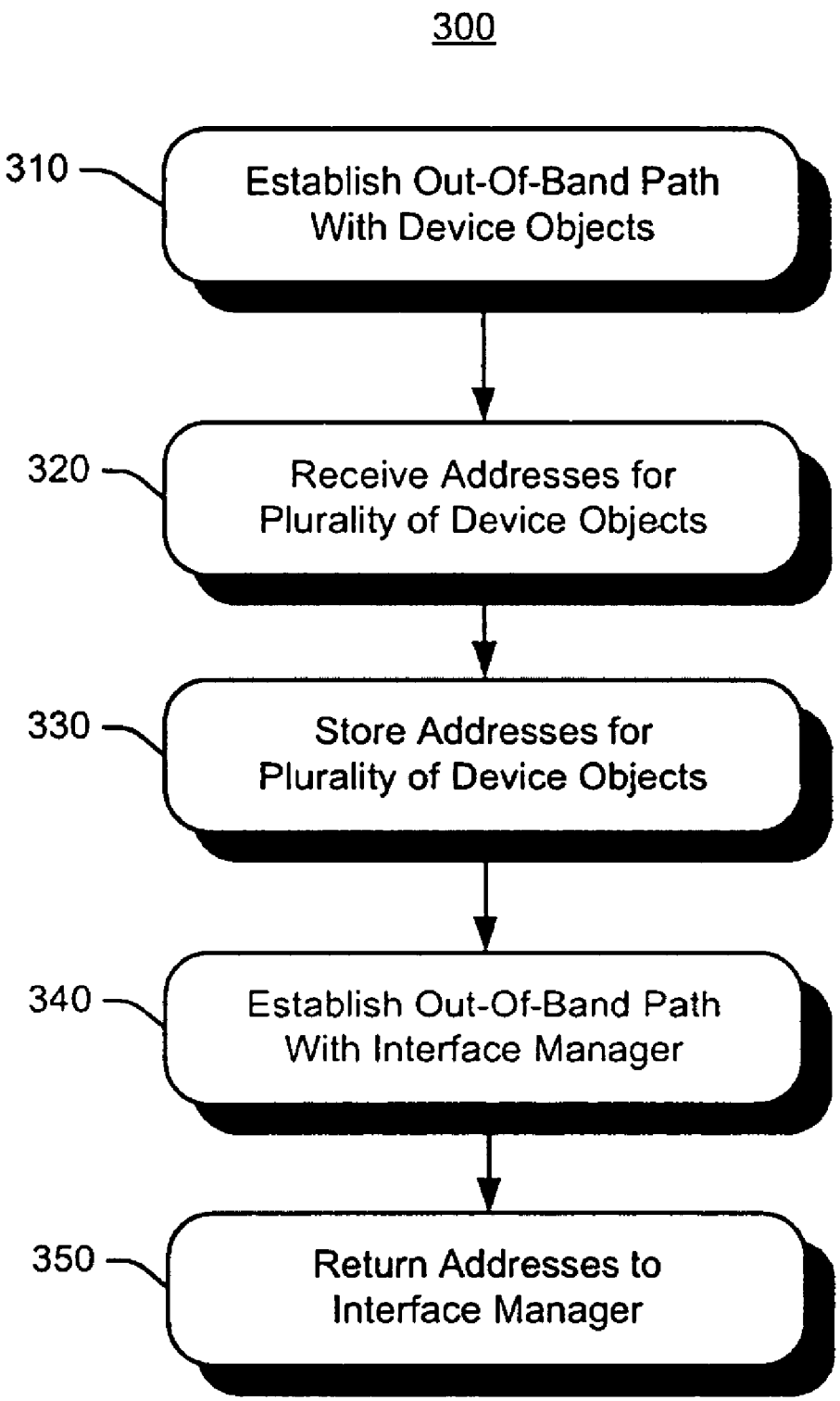

US 7,990,812 B2

STORAGE SYSTEMS AND METHODS FOR PUBLISHING DEVICE ADDRESSES

CROSS REFERENCE TO RELATED APPLICATIONS

This Application claims the benefit of U.S. Provisional Application Ser. No. 61/032,156, filed Feb. 28, 2008, titled "STORAGE SYSTEMS AND METHODS FOR PUBLISHING DEVICE ADDRESSES" which is hereby incorporated by reference herein as if reproduced in full below.

BACKGROUND

Computer storage systems may be provided for handling large volumes of computer-readable data on removable storage media, such as magnetic tape cartridges and optical storage media, to name only a few examples (generally referred to herein as "storage cartridges"). Such storage systems may be provided as automated storage systems including one or more storage locations for a plurality of storage cartridges and a robotic picker assembly (or "picker") to handle the storage cartridges. One or more tape drives may be included for read/write operations on the storage cartridge. The picker and tape drives are generally be referred to as "storage devices."

Issuing management commands to manage these storage devices can be challenging when the commands are sent over the same path that is used for data commands. For example, a backup procedure may be interrupted and/or errors may be introduced if a tape drive receives management commands during the backup procedure.

Some storage systems include a management path via an Ethernet port so that management commands can be sent to a storage device without disrupting data traffic. However, the IP address of the storage devices must be discovered by an external management application before management commands can be issued to the device via the Ethernet port. To determine the IP addresses of storage devices in the storage system, the management application broadcasts a message to all the IP addresses in a given range. Any storage devices in that range subsequently send a reply containing the specific IP address of the storage device to the management application.

Broadcasting adds complexity and guesswork to the task of discovering storage devices in a library. For example, one or more storage devices may not receive the broadcast message from the management application (e.g., if the storage device has an IP address outside of the broadcast range). Any storage devices not replying to the broadcast are treated as if they do not exist.

BRIEF DESCRIPTION OF THE DRAWINGS

FIG. 2 is a high-level schematic diagram of an exemplary automated storage system which may publish device addresses.

FIG. 3 is a process flow diagram showing exemplary operations which may be implemented by an automated storage system to publish device addresses.

DETAILED DESCRIPTION

Figure 1:
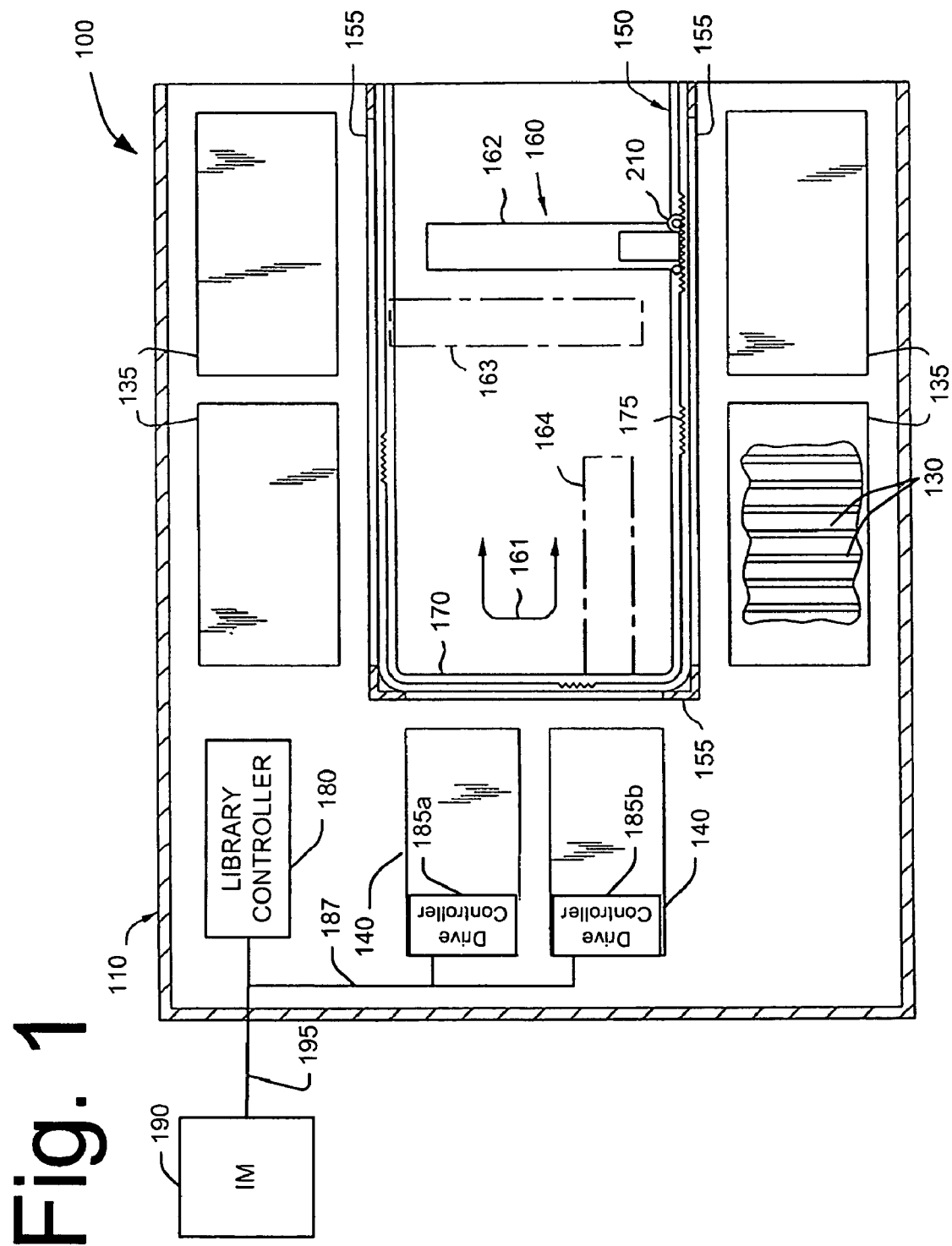
FIG. 1 is a top plan view of an exemplary automated storage system which may publish device addresses.

Storage systems and methods for publishing device addresses are disclosed. Exemplary embodiments may implement an "out-of-band" path between storage devices or "device objects" (e.g., tape drives and/or pickers) in the storage system (e.g., via an automation drive interface (ADI)) and a library controller to enable the library controller to query the addresses (e.g., IP addresses) of the device objects, and an "out-of-band" path between the library controller and an external management application(s) to enable the external management application to query the IP addresses of the device objects. It is noted that the term "out-of-band" path as used herein refers to a connection that is separate and apart from the data connection (or "in-band" path). Providing an "out-of-band" path enables communication of control signals during read/write operations without disrupting data transmission.

The storage systems and methods described herein may be implemented so that a management application does not have to broadcast messages to the device objects and then set up a listener to receive replies to the broadcast. This simplifies the discovery logic in the management application. This also eliminates guesswork of discovering device objects associated with broadcasting in an expected IP address range. External management applications are able to discover the IP addresses of device objects even if those IP addresses are outside of an expected range of IP addresses for a particular storage system.

Exemplary System

FIG. 1 is a top plan view of an exemplary automated storage system. Exemplary storage system 100 may include one or more libraries 110. The libraries 110 may be modular (e.g., configured to be stacked one on top of the other), allowing the storage system 100 to be readily expanded. The library 110 is configured to store computer readable data on one or more storage cartridge, such as magnetic data cartridges, optical media, and disk drives, to name only a few examples.

The storage cartridges may be provided in one or more storage locations 130. In an exemplary embodiment, the storage cartridges may be stored in one or more removable storage magazines 135, each having a plurality of storage locations. The storage locations may be arranged in the library 110 as shown in FIG. 1, although other arrangements are also possible.

One or more drive devices 140 may also be provided for read/write operations. In one exemplary embodiment, each library 110 is provided with at least one drive device 140. However, in other embodiments the drive devices 140 do not need to be included with each library 110 in a storage system 100.

The storage system 100 may also include at least one robotic picker assembly, or picker 160. For example, the picker 160 is adapted to engage a storage cartridge, withdraw the storage cartridge (e.g., from one of the storage locations 130), transport the storage cartridge, and insert the storage cartridge into the drive device 140 for a read/write operation.

Picker 160 may be mounted to a guide system 150 in the storage system 100. In one implementation, the guide system 150 may be mounted in a translate frame 155 that moves the picker 160 between vertically stacked libraries 110. In any event, guide system 150 may define a horizontal displacement path (illustrated by arrows 161) adjacent the storage locations 130 and the data access device(s) 140.

For purposes of illustration, picker 160 is shown in FIG. 1 as it may be moved through displacement path 161 to positions 162, 163, and 164. The picker 160 is positioned adjacent the storage locations 130 at positions 162, and 163, and adjacent one of the drive devices 140 at position 164.

In an exemplary embodiment, the guide system 150 may comprise a railing 170 and a gear track 175. Picker 160 may be movably mounted to the railing 170. The picker 160 also includes gears (not shown) that cooperate with gear track 175 to move the picker 160 through displacement path 161 on the guide system 150.

It is noted that although the storage system 100 is shown in FIG. 1 according to a particular configuration, other suitable configurations are also contemplated as being within the scope of the invention. In addition, the number of libraries, and the number of storage locations and drive devices provided with each library, may depend upon various design considerations. Such considerations may include, but are not limited to, the frequency with which data is accessed. Still other considerations may include, by way of example, the physical dimensions of the library, the storage locations, and/or the drive devices.

Storage system 100 may also include a library controller 180 for implementing control operations in the library 110. An exemplary library controller 180 may include a processor (or processing units) and software and/or firmware provided in computer-readable storage (or memory), or other logic. The library controller 180 is operable to process computer-readable instructions (e.g., computer data signals embodied in one or more carrier waves). The computer-readable instructions may be received from a network computer, user interface provided as part of a storage system, or a system memory.

Library controller 180 may include program code to control movement of the picker 160. For example, library controller 180 may establish a communications link (e.g., via RF communication) with a picker controller (not shown) at the picker 160. Library controller 180 may then issue commands, e.g., to retrieve storage cartridges from the storage locations 130 in the automated storage system 100 and deliver the storage cartridges to the drive device 140. Library controller 180 may also include program code for maintaining system inventory.

Library controller 180 may be linked to one or more drive controllers 185a, 185b at the drive devices 140 via an out-of-band path 187 (e.g., a hard-wired connection such as via the ADI). Library controller 180 may be implemented to issue commands to one or more drive controllers 185a, 185b via the ADI 187. Drive controllers 185a, 185b may also be provided with processing capability and program code to control operations at the drive devices 140 (e.g., load, eject, drive status, etc.) in response to instructions from the library controller 180 and/or an interface manager 190.

In an exemplary embodiment, interface manager 190 may be communicatively coupled to the library controller 180 via an out-of-band path 195 (e.g., an indirect connection such as TCP/IP). Interface manager 190 may control operations for the storage system 100 and provide an interface between the storage system 100 and clients for managing individual devices in the storage system. The interface manager 190 may also invoke program code for publishing addresses of device objects in the storage system 100, as described in more detail below with reference to FIG. 2.

FIG. 2 is a high-level schematic diagram of the exemplary automated storage system 100 shown in FIG. 1 which may publish device addresses. As previously mentioned, the storage system 100 may include interface manager 190 and at least one library controller 180 for a plurality of device objects. Device objects are shown in FIG. 2 including tape drives 140a-c and pickers 160a-c. However, device objects may be defined to include any of a wide variety of devices in the storage system 100 such as a library, tape drive, piece of media, door, or a storage slot which can be managed and/or report its status.

Also shown in FIG. 2 is the out-of-band paths 200a-b which provide separate communication links from the data connections (or in-band paths 201a-b, respectively) between the library controller 180 and the device objects (e.g., tape drives 140a-c or pickers 180a-c). In an exemplary embodiment, the out-of-band paths 200a-b may be implemented using a direct or hard-wired connection such as the ADI. The interface manager 190 may either be linked via a hard-wired connection, or via an indirect but still out-of-band connection 210 (e.g., TCP/IP) because there are a limited number of library controllers.

In an exemplary configuration, the public Ethernet port on the interface manager is connected to a local area network (LAN). The Ethernet switch on the interface manager is used to create a private network between the interface manager and the library controller. The interface manager provides Dynamic Host Configuration Protocol (DHCP) services for this private LAN. The library controller uses a custom DHCP class id when registering with the interface manager. This allows the interface manager to recognize the library controller and store the IP address.

In other exemplary configurations, the library controller has an Ethernet port connected to the LAN. The library controller provides a private LAN that the interface manager is connected to. The library controller provides DHCP services over the private LAN to the interface manager.

During operation, then, the library controller 180 receives the device address for each of the device objects connected to the library controller 180. For example, the library controller 180 may receive the device address during start-up, or as new devices are added (e.g., so-called "hot-plug" functionality). Accordingly, the interface manager 190 only has to make a single call to the library controller 180 to discover all of the device objects connected to that library controller 180.

It is noted that the interface manager 190 may make more than one call to the library controller 180. For example, the storage system 100 may include more than one library controller, each linked to the interface manager 190. In this example, the interface manager 190 may make a single call to each of the library controllers. It is also noted that in hot-plug or auto-discovery mode, the library controller 180 may send the interface manager 190 a message identifying new devices which have been added to the storage system since start-up. In any event, however, the interface manager 190 can discover all device objects currently connected to the library controller 180 without having to make multiple requests to the library controller 180 based on the number of device objects.

The interface manager 190 may also be connected to an external server 220, e.g., for executing a management application. For example, the connection may be via an indirect connection 230 (e.g., TCP/IP over LAN).

The interface manager 190 may also be connected to a Library Management Server 222. The Library Management Server 222 is a special type of an EMF (ETLA Management Framework) or "Device Object Framework" server specific to the library controller that the interface manager communicates with to retrieve SOAP objects over a private LAN. The library controller 180, in turn, also runs an instance of an EMF server 224 which provides objects via the framework backup to an external management application executing on a management station over a public LAN.

The Library Management Server 222 implements a device object framework Simple Object Access Protocol (SOAP) services as well as a set of Library Operations. The device object framework services allow a client to manipulate device objects. A client can use this framework to determine which device objects are supported, determine attributes of each device object (e.g. what properties an object has, and for each property what is its data type, description, validation rules, etc.); retrieve current state for a device object; and modify properties of a device object.

The Library Operations services provide a client interface to initiate library operations or retrieve information not available through the standard device object framework. The Library Operations service interface leverages the device object framework to: retrieve inventory information; perform media management (move, unload, load operations); initiate library diagnostic tests; retrieve library logs; reboot library components.

The Device object Framework is an object model that provides a standard way to retrieve and modify the properties of key Library Management Server objects. The framework provides a mechanism to retrieve type and validation information about each property. It also enables the Library Management Server to return new or vendor unique information without having to change the SOAP interface.

Before continuing, it should be understood that the exemplary embodiments discussed above are provided for purposes of illustration and are not intended to be limiting. Still other implementations are also contemplated.

Exemplary Operations

FIG. 3 is a process flow diagram showing exemplary operations 300 which may be implemented by an automated storage system to publish device addresses. The operations may be embodied as logic instructions on one or more computer-readable media. The logic instructions may he executed on one or more processing units to implement the described operations. In an exemplary embodiment, the components and connections depicted in the figures may be used.

In operation 310 an out-of-band path may be established between the library controller and each of a plurality of device objects in the storage system. In operation 320, addresses are received for the device objects in the storage system. For example, the library controller may receive the addresses over a hard-wired, out-of-band path to each of the device objects. In operation 330, the addresses for the plurality of device objects are stored. For example, the library controller may store the addresses so that all of the addresses can be returned to the in response to a single call by the interface manager. In operation 340, an out-of-band path may be established between the library controller and the interface manager. In operation 350, the addresses for the plurality of device objects are returned over another out-of-band path to the interface manager.

Accordingly, the interface manager is able to discover all of the device objects in the storage system without broadcasting and without using, a predetermined range of addresses. Thus, the method is deterministic, enabling all device objects to be identified and nothing is left to chance. (e.g., that a device was out of the predetermined range of addresses used for broadcasting). Addresses of all device objects in the storage system may then be returned to the management server for management operations.

For purposes of illustration, the management server may use the addresses to push down maps to specific tape drives to enable various hosts while blocking access by other hosts to avoid conflicts. Or for example, the management server may use the addresses to deliver encryption keys or firmware to specific devices in the storage system. The management server may also use the addresses to upload support tickets from specific devices in the storage system. These and other uses will be readily understood by those having ordinary skill in the art after becoming familiar with the teachings herein.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A storage system comprising:
    a plurality of device objects, each having a unique address;
    a library controller having an out-of-band path to each of the device objects;
    an interface manager having an out-of band path to the library controller; and
    logic executable by the interface manager to retrieve addresses for each of the plurality of device objects reported to the library controller over the out-of band path to each of the device objects.

2. The system of claim 1 further comprising a management server having a connection to the interface manager for receiving the addresses for each of the plurality of device objects.

3. The system of claim 1 wherein the out-of-band path to each of the device objects is hard-wired.

4. The system of claim 1 wherein the out-of-band path between the interface manager and the library controller is a TCP/IP connection.

5. The system of claim 1 wherein the interface manager discovers all device objects via a single call to the library controller.

6. The system of claim 1 wherein the interface manager deterministically discovers all device objects without broadcasting.

7. The system of claim 1 wherein the interface manager discovers all device objects without using a predetermined range of addresses.

8. The system of claim 1 wherein out-of-band communication is via SOAP function calls.

9. The system of claim 8 wherein the SOAP function calls include object properties for a class of device.

10. A method for publishing device addresses in a storage system, comprising:
    receiving addresses for a plurality of device objects in the storage system over an out-of-band path to each of the device objects;
    storing the addresses for the plurality of device objects in the storage system; and
    returning the addresses for the plurality of device objects in the storage system over another out-of-band path to an interface manager for the storage system.

11. The method of claim 10 further comprising returning the addresses for the plurality of device objects in the storage system from the interface manager to a management server.

12. The method of claim 10 further comprising issuing device commands from the interface manager to at least one of the device objects.

13. The method of claim 10 wherein returning the addresses for the plurality of device objects in the storage system over the out-of-band path to the interface manager is via a single ADI call by the library controller to each of the device objects, and the interface manager then makes a SOAP call to the library controller to receive the addresses for each of the device objects.

14. The method of claim 10 wherein returning the addresses for the plurality of device objects in the storage system over the out-of-band path to the interface manager is at start-up.

15. The method of claim 10 wherein returning the addresses for the plurality of device objects in the storage system over the out-of-band path to the interface manager is during operation for hot-plug functionality.

16. The method of claim 10 further comprising discovering all device objects in the storage system without broadcasting.

17. The method of claim 10 further discovering all device objects in the storage system regardless of a predetermined range of addresses.

18. A system for publishing device addresses, comprising:

means for identifying addresses for a plurality of device objects at a library controller over an out-of-band path to each of the device objects; and means for discovering all of the plurality of device objects at an interface manager by a single call over another out-of-band path to the library controller without broadcasting and without using a predetermined range of addresses.

19. The method of claim 18 further comprising means for directly connecting the library controller to each of the device objects.

20. The method of claim 18 further comprising means for indirectly connecting the library controller to the interface manager.

21. The method of claim 18 wherein the addresses are IP addresses.

* * * * *